United States Patent [19]

Jackson

[11] 4,100,390
[45] Jul. 11, 1978

[54] CONTROL MEANS FOR TIG TYPE TORCHES AND THE LIKE

[75] Inventor: George Robert Jackson, Oakford, Pa.

[73] Assignee: Arcstart, Inc., Oakford, Pa.

[21] Appl. No.: 632,862

[22] Filed: Nov. 17, 1975

[51] Int. Cl.² ............................................. B23K 9/10
[52] U.S. Cl. ..................................... 219/74; 219/132
[58] Field of Search ............... 219/74, 75, 130, 131 R, 219/135, 132

[56] References Cited

U.S. PATENT DOCUMENTS

| | | | |
|---|---|---|---|
| 2,617,913 | 11/1952 | Oestreicher | 219/135 |
| 2,769,894 | 11/1956 | Rives | 219/130 |
| 2,871,336 | 1/1959 | Lobosco et al. | 219/74 |
| 3,042,791 | 7/1962 | Reeh | 219/75 |
| 3,132,235 | 5/1964 | Anderson | 219/75 |
| 3,409,756 | 11/1968 | Manz | 219/130 |
| 3,459,996 | 8/1969 | Adamson et al. | 219/135 |
| 3,584,185 | 6/1971 | Mann et al. | 219/130 |
| 3,617,681 | 11/1971 | Dyson | 219/74 |
| 3,662,147 | 5/1972 | Ogden, Sr. et al. | 219/130 |
| 3,934,110 | 1/1976 | Denis | 219/135 |

FOREIGN PATENT DOCUMENTS

| | | | |
|---|---|---|---|
| 174,742 | 5/1964 | U.S.S.R. | 219/74 |

Primary Examiner—J. V. Truhe
Assistant Examiner—Clifford Shaw
Attorney, Agent, or Firm—Louis Weinstein

[57] ABSTRACT

Control means for a welder of the "tungsten-inert-gas" type which senses even momentary engagement of the workpiece by the torch to initiate gas flow. The welding region is initially purged by the gas. After a predetermined timed interval the output of the welding power source is elevated to a level sufficient to cause the striking of an arc.

Gas flow is maintained during the welding operation and for a predetermined time interval after extinction of the arc is detected.

Means are also provided for visually indicating gas flow and further for automatically preventing the striking of an arc when gas flow is exhausted.

Means are provided so that the welder power supply may also be turned on automatically to eliminate the need for foot or hand-operated switches conventionally used to turn on the welder power supply.

Sensing means are also provided to protect the torch from becoming accidentally "welded" to the workpiece.

19 Claims, 3 Drawing Figures

CONTROL MEANS FOR TIG TYPE TORCHES AND THE LIKE

BACKGROUND OF THE INVENTION

The present invention pertains to welding control apparatus and more particularly to novel apparatus for sensing the condition of the welding torch and/or arc to control the energization of the torch and the flow of inert gas used in conjunction with the torch.

Welding techniques such as the metal-inert-gas (MIG) and tungsten-inert-gas (TIG) schemes provide for the flow of inert gas in the immediate region of the welding electrode to prevent the torch electrode from becoming oxidized during welding as well as during any time in which the electrode is heated to a temperature sufficiently elevated to result in unwanted oxidation. This problem is extremely bothersome in TIG techniques since it leads to the necessity of regrinding the welding electrode to remove the oxidized metal.

It is thus preferred to provide a flow of the inert gas prior to the striking of an arc to purge the welding area and prevent the welding electrode from becoming oxidized; to maintain gas flow during the welding operation and to sustain gas flow after completion of the welding operation for a period of time sufficient to enable the welding electrode to cool to a level low enough to prevent oxidation once the gas flow is terminated. These operations have most frequently been performed manually.

Since the inert gas or gases employed in the above mentioned techniques are rather expensive, control means have been developed wherein inert gas is caused to flow as soon as the arc is struck and continued gas flow is sustained during the welding operation and a predetermined time after the welding operation is terminated to allow the welding electrode to cool sufficiently to prevent oxidization.

Due to the harmful rays and heat generated by TIG and MIG welding, the operator must take appropriate safety precautions which typically includes the use of heavy protective cloths, gloves and a welding mask. Present-day welding control systems are typically activated by the operation of either hand or foot switch means. The heavy protective equipment worn by the welder makes the operation of such a switch very awkward. Also, if the operation should happen to forget to turn on the gas before manipulating the switch, welding may accidentally occur causing a bad spot on the workpiece and oxidizing the welding electrode, requiring both the workpiece and the welding electrode to be respectively cleaned and resharpened.

BRIEF DESCRIPTION OF THE INVENTION

The present invention is characterized by providing novel control means for welding equipment and which is especially advantageous for use in TIG and MIG welding wherein the control means conserves the inert gas utilized by limiting the flow of gas to only those periods during which the gas flow is necessary while at the same time providing sensing means for automatically initiating a welding operation without the need for either foot- or hand-operated switches thereby reducing the number of activities which are required to be performed by the operator in setting up a welding operation. Also, since the control means provides a time delay between the engagement of the workpiece by the welding torch and the striking of an arc, chances of creating accidental flashes during the welding preparation, are significantly reduced.

The sequence of events is such that when the operator is ready to initiate a welding operation he need only lightly touch the workpiece with the tip of the welding electrode. This causes a very low voltage (i.e., short circuit) condition which is sensed by comparator means to immediately initiate the flow of gas through the torch and into the immediate region of the welding electrode.

During this time, although the welding power supply is energized, current limiting means reduces the current supplied to the torch to a level sufficient to prevent the striking of an arc. The comparator means simultaneously abruptly discharges a first energy storage means and slowly charges a second energy storage means. Second comparator means senses the level of the second discharge means to activate the bypass means.

After the gas flow has been sustained for a sufficient period of time (usually of the order of two or three seconds) the current limiting means is bypassed to apply power to the torch and workpiece at a current level sufficient to initiate the striking of an arc. The circuit which senses the touching of the workpiece by the welding electrode discharges the first energy storage means, which is charged only upon extinction of the arc and at an adjustable discharge rate. Comparator means monitors the energy level of the energy storage means to terminate gas flow and deactivate the by-pass means only after the welding electrode has had sufficient time to cool to a level to prevent oxidization to the welding electrode.

Visually observable means is preferably incorporated for indicating the presence of gas once the valve means is opened and, in one preferred embodiment, is provided with switch means for preventing the striking of an arc in the event that the valve means is opened and the gas reservoir is exhausted.

The above mentioned techniques protect the operator against accidental instantaneous striking of an arc, protect the workpiece and welding electrode against undesirable oxidization and further act to conserve the amount of inert gas utilized in the welding operation.

By coupling line voltage across the torch leads, "touching" the torch to the workpiece may also be employed to activate the welder power supply thereby eliminating the foot-switch normally employed for this purpose.

Further monitoring means is provided by sensing the period of time that the torch engages the workpiece to prevent accidental welding of the torch to the workpiece. Delay means is provided to prevent momentary removal of the torch from the workpiece from erroneously operating to shut off either the inert gas source or the power supplies, or both.

BRIEF DESCRIPTION OF THE FIGURES AND OBJECTS OF THE INVENTION

It is therefore, one object of the present invention to provide novel means for automatically initiating a welding operation while eliminating the need for manually operable switches heretofore utilized for this purpose.

Another object of the present invention is to provide novel means for sensing even the light momentary touching of the welding electrode to the workpiece as constituting an act which initiates a welding operation so as to initiate an immediate flow of inert gas and delayed energization of the welding electrode to cause the delayed striking of an arc after the welding region has been purged by the inert gas.

Still another object of the present invention is to provide control means for preventing the striking of an arc, even after a predetermined delay period, in the event that the inert gas supply is exhausted.

Still another object of the present invention is to provide a means for sensing a short circuit condition of low current magnitude and means for sensing the extinction of an arc to respectively provide immediate gas flow and delayed striking of an arc and, upon removal of the torch from the workpiece, to provide sustained gas flow for a period sufficient to cool the welding electrode and workpiece, each of said delay periods being of a length sufficient to prevent undesirable oxidization while at the same time conserving against the wasteful use of the inert gas.

The above as well as other objects of the present invention will become apparent upon reading the accompanying description and drawings, in which.

DETAILED DESCRIPTION OF THE INVENTION

Figure 1:
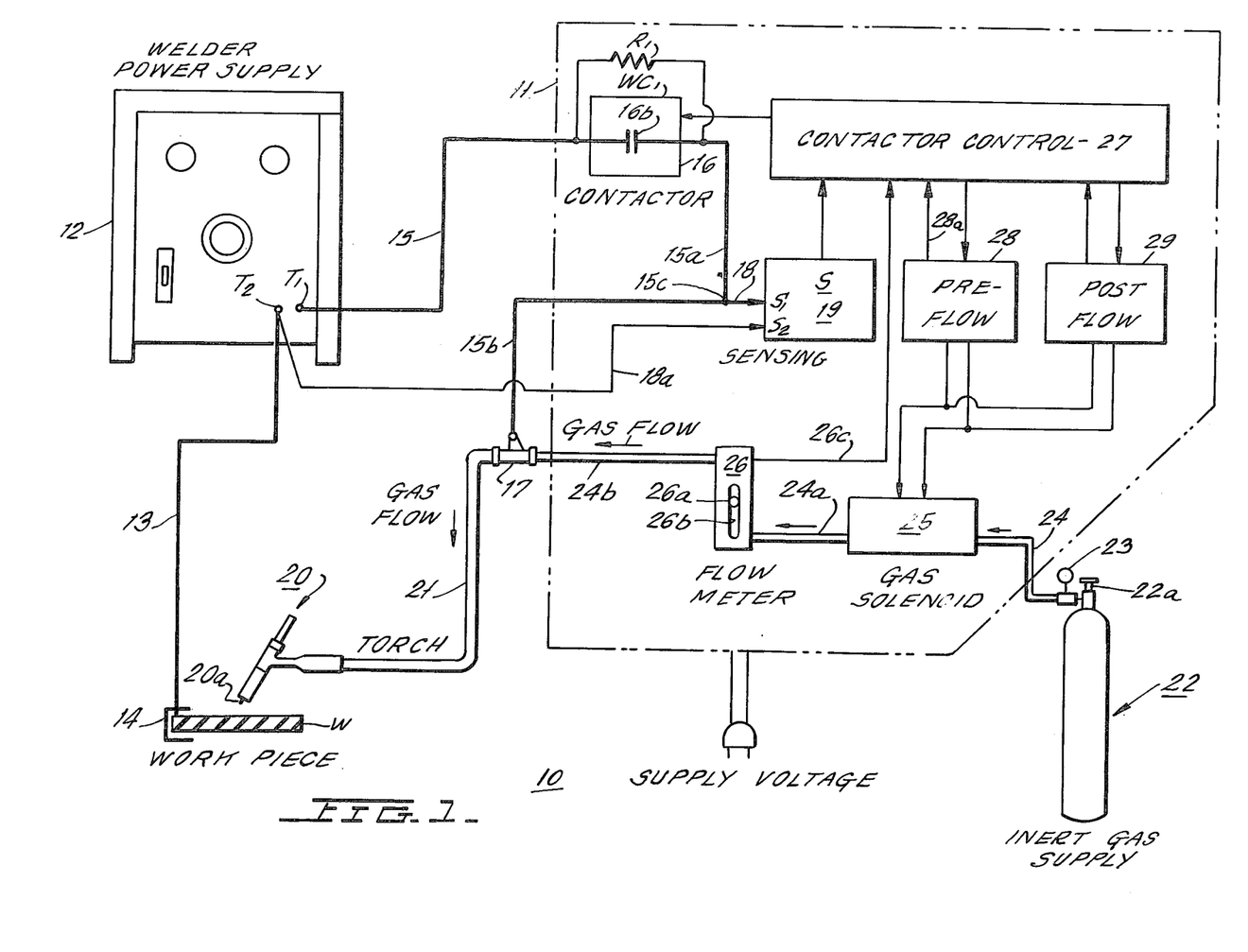
FIG. 1 shows a simplified block diagram of welding apparatus including control means designed in accordance with the principles of the present invention.

FIG. 1 shows welding apparatus 10 incorporating a control circuit 11 which is designed in accordance with the principles of the present invention.

The welding apparatus includes a welding power supply 12 having a pair of power supply output terminals T1 and T2.

The terminal T2, which may typically may be the ground reference terminal, is electrically connected to the workpiece W by means of the power supply ground cable 13 and a suitable conductive clamp 14. Cable 13 is typically an insulated high current welding cable.

A similar high current welding cable 15 is electrically connected between terminal T1 and one terminal of welding contactor 16 as well as one terminal of high wattage resistor R1. The opposite terminals of contactor 16 and resistor R1 are connected through cable sections 15a and 15b to a coupler element 17 which forms part of the welding torch assembly. The common terminal 15c between cable sections 15a and 15b is coupled through a low-current lead 18 to one input of sensitivity detector means 19. The other input of detector means 19 is coupled through a low-current carrying wire 18a to the ground terminal T2 of the welder power supply 12.

Coupler 17 provides the means for establishing an electrical connection between the welding electrode 20a of torch 20 and the high-voltage terminal T1 of the welder power supply. Although not shown for purposes of simplicity, it should be understood that a suitable electrical cable of heavy current carrying capacity is provided in cable assembly 21 for connecting the high voltage level from coupler 17 to electrode 20a. Coupler 17, cable 21 and the hand-held torch member 20 are also provided with cooperating preferably annular-shaped, hollow conduit means for passing inert gas from supply 22 to the region immediately surrounding the welding electrode 20a. Reservoir 22 is provided with a regulating knob 22a and a manually observable meter 23 for regulating the flow rate of the inert gas. A conduit 24 couples reservoir 22 to solenoid operated gas valve 25. Two additional conduit sections 24a and 24b respectively couple solenoid operated valve 25 to flow meter 26 and couples flow meter 26 to coupler 17.

The sensing circuit 19 is coupled to the contactor control means 27 which regulates the pre- and post-flow control circuits 28 and 29 respectfully for selectively controlling the solenoid operated valve 25 to open and shut the gas valve and thereby provide appropriate pre- and post-gas flow as will be more fully described hereinbelow. The flow meter 26, in one preferred embodiment, includes gas pressure actuated switch means for activating the contactor control means 27 to prevent the striking of an arc in the event that the gas reservoir is exhausted.

The operation of the apparatus of FIG. 1 is as follows:

Clamp 14 is mechanically and electrically secured to workpiece W so as to place the workpiece at the potential of welder power supply terminal T2.

The welder power supply 12 is turned on and develops a voltage across output terminals T1 and T2 which is sufficient to cause the striking of an arc and to sustain an arc once it is struck.

However, contactor 16, being normally open at this time, places power resistor R1 in the electrical circuit. When the electrode 20a of torch 20 is either brought into contact with or very lightly touched upon the workpiece W which is to be welded, the limited current in the welding circuit due to resistor R1, is of a reduced magnitude sufficient to prevent the striking of an arc. Thus, even though the operator touches the workpiece with the welding electrode 20a, no arc will be struck. However, the touching of the workpiece establishes a momentary ground or zero signal level at input terminal S1 of sensing circuit 19. This condition activates contactor circuit control 27 to, in turn, activate pre-flow and post-flow circuits 28 and 29. As soon as the pre-flow circuit 28 is activated the output operates the solenoid 25 to open the valve and cause inert gas to purge the welding region. A predetermined time interval thereafter (typically 1 to 3 seconds) the output 28a of pre-flow circuit 28 triggers contactor control circuit 27 to cause the normally-open contactor 16 to close, establishing a short-circuit condition across power resistor R1 to provide the torch with welding current of a level sufficient to initiate the striking of an arc. An arc may be safely struck at this time since the welding region has been sufficiently purged by the inert gas and further since the electrode 20a is totally immersed in the inert gas to prevent undesirable oxidization.

Initiation of the control circuitry requires only that the welding electrode be lightly touched upon the workpiece and the welding electrode need not be maintained in contact with the workpiece during the purging time interval. Upon completion of the purging time interval the welding electrode need not be brought into electrical contact with the workpiece but need only be brought sufficiently close to the workpiece to permit an arc to be struck.

Normal welding continues in this manner and either in accordance with the duty cycle of the welding power supply or at any other suitable time, the operator may simply terminate welding by moving the torch away from the workpiece by a distance sufficient to extinguish the arc.

Sensing circuit 19 detects a change in the voltage drop between electrode 20a and the workpiece W to initiate the timing of the post-flow delay circuit 29 which sustains the flow of inert gas for a period of time sufficient to cool the welding electrode and welding region so as to enable the gas solenoid 25 to be closed without any fear that the welding region or torch electrode will experience undesirable oxidization.

The flow meter 26 is preferably provided with a transparent tube containing a ball 26a which comes into view within the viewing region 26b when inert gas is present. Flow meter 26 is preferably provided with electrical switch means for activating contactor control circuitry 27 through connection 26c in the event that the solenoid operated gas valve 25 is opened and the supply of inert gas is exhausted in order to prevent contactor 16 from being closed during a start-up period when no purging occurs and thereby prevent undesirable oxidization of the welding electrode during the start-up period in which no inert gas is present. The switch means thus relieves the operator from the necessity of having to visually observe the flow meter 26 thereby enabling the operator to concentrate his effort directly to the welding operation.

Figure 2:
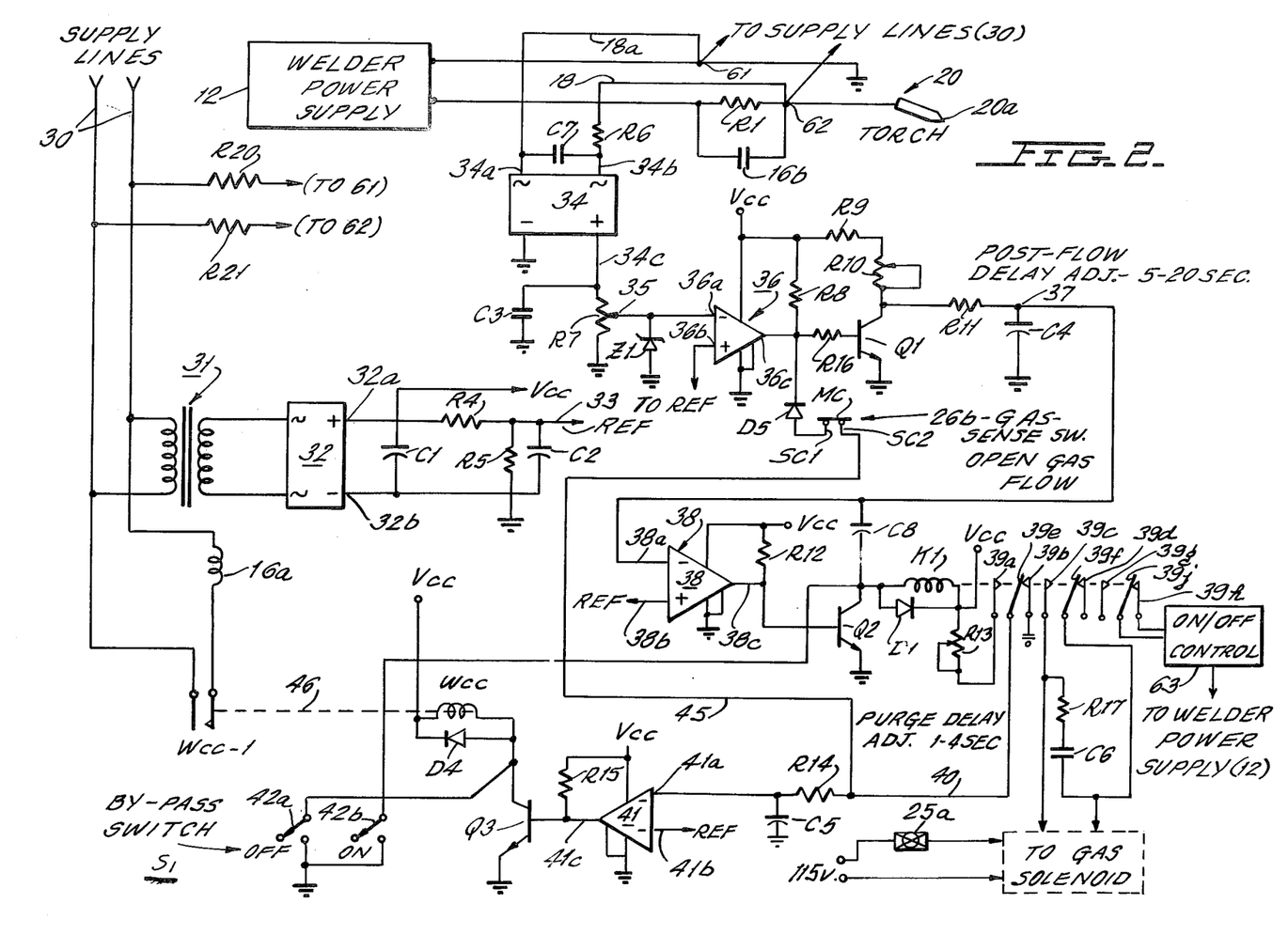
FIGS. 2 and 3 are detailed schematic diagrams of two alternative embodiments of the control means of FIG. 1.

FIG. 2 is a detailed schematic diagram of the control circuit 11 of FIG. 1. The control circuit utilizes line voltage coupled across input leads 30. A step-down voltage transformer 31 couples line voltage to a full-wave bridge circuit 32 which develops the power supply levels needed for circuit operation across the output leads 32a and 32b. Capacitor C1 functions to smooth the output voltage developed by the full-wave bridge 32. Resistors R4 and R5 form a voltage divider developing a reference voltage REF at common terminal 33. Capacitor C2 is coupled across resistor R5 the further smooth the output voltage.

Contactor 16 is further comprised of solenoid 16a coupled in series with contact WCC-1. When normally open contacts WCC-1 are closed, solenoid 16a is energized to close the welding contactor normally open contacts 16b thereby developing a short circuit across high-wattage resistor R1 to permit welding to be initiated in the manner described hereinabove.

Input leads 18 and 18a of FIG. 1 are shown in FIG. 2 as being connected to full-wave bridge 34, lead 18a being directly connected to input terminal 34a while lead 18 is coupled to input terminal 34b through resistor R6. Capacitor C7 is connected across terminals 34a and 34b.

The welding power supply voltage is rectified by full-wave bridge 34 whose output terminal 34c is coupled to the common terminal between capacitor C3 and adjustable resistor R7. The movable arm 35 of adjustable resistor R7 is coupled in common to one terminal of zener diode Z1 and to input 36a of inverting comparator 36. The remaining input 36b is coupled to terminal 33 to establish the reference level REF thereat. The output 36c of comparator 36 is coupled through resistor R16 to the base electrode of transistor Q1. The collector of Q1 is coupled through resistor R11 to one terminal of capacitor C4, whose opposite terminal is grounded.

The common terminal 37 between R11 and C4 is coupled in common to one terminal of capacitor C8 and to input 38a of inverting comparator 38. The remaining input 38b is coupled to the reference level REF while output 38c is coupled to the base electrode of transistor Q2. The collector of Q2 is coupled in common to the remaining terminal of capacitor C8, the switch arm 42b of switch S1 and one terminal of solenoid coil K1. Diode D1 is coupled across solenoid K1. The opposite terminal of coil K1 is coupled in series with adjustable resistor R13 to stationary contact 39a. Solenoid coil K1 has its armature mechanically coupled to movable contact arms 39e, 39f and 39j which are selectively engageable with stationary contacts 39a and 39c, 39j, or 39b, 39d and 39h depending upon the energization state of solenoid coil K1. Movable arm 39e is coupled through lead 40 and resistor R14 to one input 41a of non-inverting comparator 41, the remaining input terminal 41b being coupled to the reference voltage level REF.

Output 41c of comparator 41 is coupled to the base electrode of transistor Q3 whose collector is coupled to the VCC level through the parallel connection of diode D4 and solenoid WCC. A by-pass switch S1 is comprised of ganged switch arms 42a and 42b which selectively create a short-circuit across the emitter and collector electrodes of transistor Q3 and transistor Q2 respectively to by-pass and hence in-activate the control circuits for certain welding applications.

Movable switch arm 39f is adapted to selectively energize the coil of solenoid operated gas valve 25a.

The switch means 26b incorporated in flow meter 26 (note also FIG. 1) is depicted in FIG. 2 as a mechanical switch comprised of a pair of stationary contacts SC1 and SC2 and a movable contact MC which is controlled by ball 26a to develop a short-circuit across the stationary contacts in the event the supply of inert gas is exhausted. During gas flow, ball 26a is normally "lifted" to break the circuit across SC1 and SC2. Stationary contact SC1 is coupled through diode D5 to the common terminal between the output of the inverting comparator 36 and resistor R16. Stationary contact SC2 is coupled to lead 45 which is coupled in common between the electrical lead 40 and one terminal of resistor R14 and serves to prevent initiation of an arc when a supply of inert gas is exhausted as will be more fully described hereinbelow.

In accordance with the description given hereinabove as to the manner of operation of the system shown in FIG. 1, let it be assumed that the welding power supply 12 will be placed in engagement with the workpiece. Under these conditions, and prior to such engagement, substantially the entire output of the welder power supply is placed across the input 34a and 34b of full-wave bridge 34 developing a substantially high DC level at output terminal 34c and hence at the arm 35 of adjustable resistor R7.

Zener diode Z1 clamps the maximum level at input level 36a to 20 volts. Under the present circumstances, the voltage at input 36a exceeds the reference level causing output 36c to be at ground level. This condition causes transistor Q1 to be in cut-off enabling capacitor C4 to begin charging. However, when torch electrode 20a is even slightly touched upon the workpiece W, the substantially short-circuit condition across the input of full-wave bridge 34a–34b causes the input applied at 36a of comparator 36 to drop below reference level REF. This causes output 36c to go high whereupon transistor Q1 is turned on to rapidly discharge the voltage at the terminal 37 of capacitor C4. The low level at this terminal is applied simultaneously to one input of capacitor C8 and to input 38a of comparator 38. Since the level of input 38a is below the reference level REF at input 38b, the output of comparator 38 goes high causing transistor Q2 to conduit. Capacitor C8 serves to abruptly lift the level at the common line between capacitor C4 and input 38a. Conduction of transistor Q2 energizes coil K1 causing movable contacts 39e, 39f and 39j to respectively engage stationary contacts 39a, 39c and 39g. The engagement of contacts 39c and 39f complete an electrical series circuit between line voltage and the gas valve solenoid 25a to immediately open the gas valve 25 and permit inert gas to flow through torch 20 in order to purge the electrode 20a and the region of the workpiece in which the welding is to occur.

The engagement between movable contact 39e and stationary contact 39a couples the high-voltage level VCC through adjustable resistor R13 and resistor R14 to input 41a of comparator 41. Resistors R13, R14 and capacitor C5 form a time delay circuit such that the voltage level applied to input 41a rises at a rate determined by the values of timing elements R13, R14 and C5. Typically, terminal 41a reaches the reference level REF preferably 1–4 seconds after engagement of contacts 39e and 39a and hence preferably 1–4 seconds after initiation of the flow of inert gas during the purge cycle.

As soon as the level at input 41a reaches the reference level REF applied to input 41b, output 41c goes high causing transistor Q3 to conduct and establish a circuit path between supply source VCC and ground potential. Coil WCC is energized causin the normally open contact WCC-1 (mechanically coupled to the armature of coil WCC as represented by dotted line 46) to energize welding contactor coil 16a and thereby close the normally open contacts 16b of welding contactor 16 to by-pass the current limiting power resistor R1 and permit an arc to be struck.

Welding may now continue, with the flow of inert gas being sustained by maintaining the gas valve solenoid energized and maintaining normally open contacts 16b in a closed condition. The arc assures this operation by developing a voltage across the input of bridge 34 sufficient to maintain Q1 in the ON state.

If for any reason the operator desires to terminate the welding operation, the electrode is preferably displaced from the workpiece to extinguish the arc, causing the voltage applied to input 36a of comparator 36 to exceed the reference level applied at input 36b whereupon output 36c goes to ground. This drives transistor Q1 into cut-off enabling capacitor 37 to begin charging towards VCC at a rate controlled by the values of resistor R10 and R11 and capacitor C4. The voltage at terminal 37 thus rises from ground potential toward the reference level REF. The time constants of the time delay circuit are preferably adjusted to provide a post-flow delay period of from 5 to 20 seconds. Depending upon the adjustment of the time constant, input 38a reaches the reference level causing the output 38c of comparator 38 to go to ground level thereby driving transistor Q2 into cut-off and de-energizing coil K1. This causes contacts 39e and 39f (which are biased by means not shown) to engage contacts 39b and 39d respectively. The open circuit established between diengaged contact 39c and 39f de-energizes the gas valve solenoid 25a after a time interval in the range from 5 to 20 seconds after extinction of the arc. The engagement of switch arm 39e with ground contact 39b permits capacitor C5 to discharge rapidly through resistor R14 towards ground potential. As soon as the voltage level at input 41a goes below reference level REF, the comparator output 41c goes to ground causing transistor Q3 to be driven into cut-off and hence de-energize the solenoid WCC, opening the previously closed contacts WCC-1. This de-energizes solenoid 16a opening the contacts 16b of the welding contactor 16 and again placing resistor R1 in series connection between the welder power supply 12 and the torch 20, reducing welding current below the level sufficient to either sustain or initiate an arc.

In the event the operator wishes to initiate a welding operation and touches the welding electrode 28 to the workpiece at a time when the gas supply is exhausted, the gas valve solenoid 25a will be energized to open the gas valve. However, since the supply of inert gas is assumed to be exhausted at this time, ball 26a is not "lifted" causing movable contact MC to engage stationary contacts SC1 and SC2 coupling the output level at terminal 36c (which is at ground potential just prior to electrode 20a touching the workpiece) to the common terminal between resistor R14 and movable contact arm 39e. Capacitor C5 is rapidly discharged, applying a level below reference REF to input 41a which causes output 41c of comparator 41 to go low thereby driving transistor Q3 into cut-off de-energizing WCC and opening contacts WCC-1 and 16b to prevent an arc from being struck without waiting for the pre-flow delay period to elapse.

In the event that the supply of gas is exhausted during welding, the gas sensing switch 26b (even though closed) has no effect at that time due to diode D5 which isolates the output of comparator 36 from capacitor C5. However, as soon as the arc is extinguished and attempted to be re-started, the exhaust gas supply is detected by the gas sense switch 26b as described hereinabove to prevent re-striking of an arc, since output 36c goes to ground to rapidly discharge C5.

The technique employed hereinabove for selectively providing sufficient current for arcing to the torch may also be utilized to automatically control the activation and deactivation of the welder power supply 12. As is well known, such power supplies have duty cycles requiring that their ON time be limited to a maximum time interval and that they undergo a DOWN time sufficient to allow the welder power supply to cool before reusing, the ON and DOWN times being dictated by the welder power supply manufacturers to guarantee longer useful operating lives. Thus, it is advantageous to have the welder power supply on only during those times at which welding takes place. Hence, with only a slight modification of the system described hereinabove automatic operation of the welder power supply is also obtained.

As shown in FIG. 2, the AC supply lines 30 are connected to points 61 and 62 through resistors R20 and R21, respectively, which resistor have high resistance and low wattage. In addition to the above, the relay of FIG. 2 is provided with stationary contacts 39g and 39h and with movable contact 39j, which is mechanically coupled to the armature of solenoid coil K1, this mechanical connection being represented by the dotted line. Stationary contact 39h and movable contact 39j are coupled to the ON-OFF control means 63 which selectively couples the welder power supply 12 to its power source. In the position shown, i.e., with movable contact 38j displaced from stationary contact 39g, the control 63 will maintain the welder power supply 12 de-energized.

The mode of operation of the equipment of FIG. 2 is as follows:

The torch 20 is touched upon the workpiece. At this time, the welder power supply 12 is de-energized. However, ponts 61 and 62 are coupled to the supply lines 30 through resistors R20 and R21 providing power across the inputs 34a and 34b of the full wave bridge 34. As soon as the torch is touched to the workpiece, the voltage across inputs 34a and 34b is substantially zero which is the same condition as was described hereinabove when the welder power supply 12 is energized, so as to ultimately cause energization of solenoid K1 in the same manner as was described hereinabove, whereby, in addition to causing movable contacts 39e and 39f to engage their stationary contacts 39a and 39c, further causes movable contact 39j to engage stationary contact 39g, thereby causing the ON-OFF control 63 to energize the welder power supply 12 at the same time that the gas source is turned on whereby the power supply undergoes a short warm-up period during the pre-flow purging.

As was described hereinabove, and in the event that the touch is removed from the workpiece a distance sufficient to terminate the arc, the previously engaged contacts 39g and 39j become disengaged causing the welder power supply to be turned off through the operation of control 63 at the end of the post-flow period which is typically 10 seconds, but which may be adjusted to suit the needs of the user. Thus, the welder power supply is then automatically operated through the torch, thereby eliminating the need for either a manually operated foot switch or hand switch traditionally used in conventional equipment for operating the welder power supply.

Figure 3:
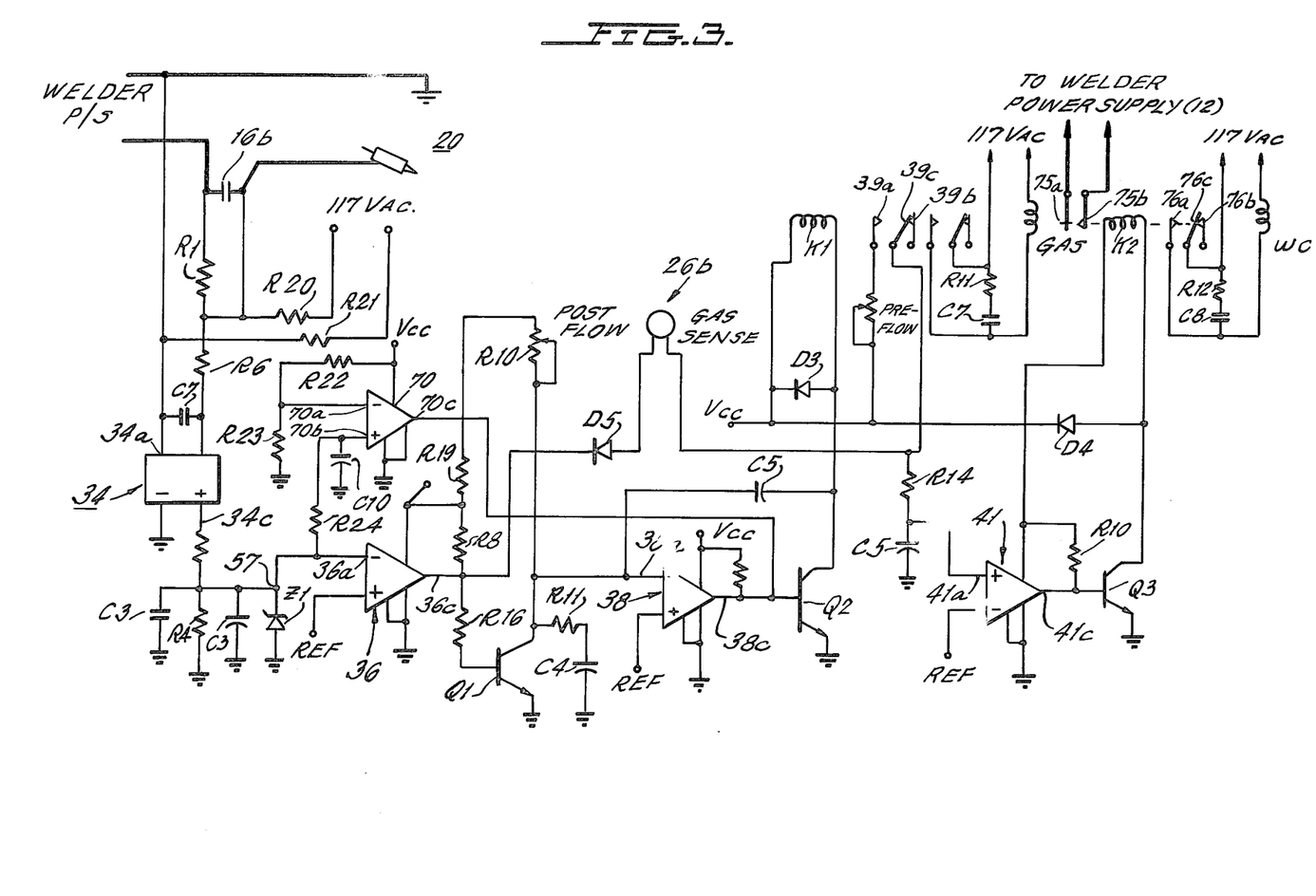

FIG. 3 shows another alternative circuit arrangement for the present invention in which like elements are designated by like numerals as between FIGS. 2 and 3. The additional and/or modified circuit elements will be described in greater detail hereinbelow.

Comparator 70 is utilized to test for a prolonged zero volt condition. For example, as was described hereinabove, the control circuitry of the present invention will automatically turn on the inert gas source and the welder power supply by momentarily touching the torch to the workpiece. However, a prolonged engagement between the live electrode of the torch and the workpiece will result in the torch rod becoming welded to the workpiece, which, obviously is an undesirable condition.

In addition thereto, and in the absence of the AC excitation voltage which is applied to the monitoring and control circuit through resistors R20 and R21, comparator 70 will also limit the time during which inert gas will remain on in the event that the welder power supply is turned off while the control unit remains energized.

Comparator 70 has its inputs 70a coupled to the common terminal between resistors R22 and R23 whose remaining terminals are respectively coupled between VCC and ground or reference potential. By appropriate selection of the resistors R22 and R23, which, if desired, be made adjustable, the voltage at the common terminal is adjusted so as to be of the order of 1 to 2 volts. Terminal 70b of comparator 70 is coupled through resistor R24 to the rectified and filtered output of full wave bridge 34, which is also applied to the inverted input 36a of comparator 36. Capacitor C10 is coupled between input 70b and ground or reference potential. The output of comparator 70 is coupled to the base electrode of transistor Q2 whose collector is coupled to solenoid coil K1. The resistances of R22 and R23 are adjusted so that the common terminal therebetween is maintained at the level of the order of 1 to 2 volts. Normal voltage with power ON (whether welding or not) is always greater than the reference voltage causing output 70c to remain OFF and hence at the high level. This maintains Q2 conductive so that coil K1 is energized, energizing the gas solenoid to permit the flow of gas, energizing the welder supply, if it has not already been turned ON, and closing the contacts 16b to provide normal welding current to the torch.

The short circuiting of the torch results in a near zero voltage level applied to input 70b of comparator 70. Capacitor C10 serves to delay the appearance of the near zero voltage to input 70b for a pre-set time, depending upon the values of R24 and C10 and typically of the order of 3 to 5 seconds. The delay is necessary, primarily because momentarily short circuiting the torch to the workpiece is a normal occurrence in order to initiate striking of the arc or to initialize the control electronics. However, if the short circuit condition is sustained for a period of time (the above mentioned 3 to 5 seconds) sufficient to permit C10 to discharge to a level below the reference level at input 70a (1 to 2 volts), output 70c goes low driving the base of Q2 to ground level to turn Q2 OFF. This de-energizes solenoid K1 to turn OFF the gas and further places a low level at the inputs 41a of comparator 41, which turns off Q3 de-energizing relay coil K2 which in turn de-energizes the welding contactor to interrupt welding current. This state is maintained until the short circuit condition between torch and workpiece is broken. The electronic controls thus protect against prolonged engagement between torch and workpiece in the event that the torch is accidentally left in engagement with the workpiece with the welding power supply and system electronics in the ON condition.

Briefly reviewing the operation of the circuitry of FIG. 3, when the torch 20 is momentarily touched upon the workpiece, the voltage level across inputs 34a and 34b of full wave bridge 34 drops effectively to zero applying a zero level to input 36a of comparator 36, whose output 36c goes high to turn on transistor Q1 which in turn causes the output 38c of comparator 38 to go high turning on Q2 and solenoid K1. Contacts 39e and 39a are engaged to cause the input 41a of comparator 41 to gradually increase at a rate determined by capacitor C5 and resistor R14 after which time output 41c of the comparator goes high to turn on Q3, energize relay solenoid K2 and close contacts 75a and 75b in order to turn on welder power supply 12 and to close contacts 76a and 76b in order to energize the coil WC which functions in the same manner as the coil of FIG. 2 in order to open contacts 16b to by-pass resistor R1 in the torch-welder circuit, and thereby provide sufficient arcing current to the torch.

Where it is desired to stop welding, the torch is displaced from the workpiece by an amount sufficient to extinguish the arc causing the comparator 36 to have its output go low thereby deenergizing transistor Q1. Capacitor C4 charges through R10 and resistor R11 until the level at input 38a of comparator 38 exceeds REF causing its output 38c to go low and thereby turn off Q2. Solenoid K1 turns off to deenergize the gas valve solenoid and close the gas valve in order to stop gas flow, typically of the order of ten seconds after the arc is extinguished.

The de-energization of solenoid coil K1 is sensed by comparator 41 to drive Q3 into cut-off and turn off solenoid coil K2 so as to turn off the welder power supply and permit contacts 16b to move to their normally open position (by de-energization of contactor winding WC).

The gas sensing means provides a direct current path between the output of comparator 36 and the input of 41a of comparator 41 when the gas in the reservoir has been exhausted to cause comparator 41 to turn off Q3 and hence turn off the welder power supply and move contacts 16b to the normally open position.

It can therefore be seen by the foregoing description that the present invention provides a novel solid state control circuit for high-powered welding systems especially of the TIG and MIG type wherein accidental flashes are substantially avoided since initial contact of the welding electrode with the workpiece delays the striking of an arc for a period usually of the order of 2 seconds and wherein adjustable pre-flow and post-flow delay periods are provided to substantially prevent the unwanted and undesirable oxidation of the torch electrode and the workpiece while at the same time substantially conserving against the wasting of the inert gas supply.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. In an arc welder including a torch, and a power supply coupled between said torch and a workpiece, control means for selectively supplying power sufficient to initiate and maintain an arc for performing an arc welding operation, said torch including a welding electrode and means for receiving a gas and directing the gas to the welding electrode region, said control means comprising:
   current reducing means remotely located from said torch and electrically connected between said torch and said power supply for reducing the current delivered to said torch from said power supply to a level insufficient to initiate welding even though the power supply is energized, while delivering a reduced level of current to the torch and workpiece;
   means for selectively short-circuiting said current reducing means;
   valve means for selectively coupling the gas receiving means to a gas source;
   first sensing means responsive to establishment of an electrical circuit caused when said torch electrode even momentarily contacts said workpiece for opening said valve means and including means for preventing said valve means from closing until after the power delivered to said torch reaches a level sufficient to initiate welding;
   first delay means responsive to operation of said first sensing means for activating said short circuiting means a predetermined delay interval after opening of said valve means whereby the power delivered to the workpiece is raised to a level sufficient to initiate and sustain an arc between the torch electrode and the workpiece, while enabling said gas to purge the welding region preparatory to the initiation of an arc; and
   second sensing means including second delay means for sensing the engagement of the torch electrode with the workpiece for the interval of said second delay means to deactivate said valve means and activate said short-circuiting means whereby the power is lowered to a level insufficient to maintain an arc and gas purges the welding region for a period sufficient to permit the welding region to cool; said delay period for said second delay means being of a length sufficient to prevent the torch electrode from becoming welded to the workpiece.

2. The apparatus of claim 1 wherein said first sensing means comprises means coupled across said current reducing means for opening said valve means when the level in said electrical circuit coupled to said first sensing means falls below a predetermined threshold.

3. The apparatus of claim 2 wherein said first sensing means is further comprised of means for providing a reference threshold level; comparator means for comparing the level of a first signal provided to said current reducing means by said power supply for generating a second signal when the level being measured drops below the threshold level.

4. The apparatus of claim 3 wherein said first delay means comprises means for rapidly storing electrical energy when triggered by said comparator;
   means for activating said valve means when the energy stored by said storing means reaches a predetermined level.

5. The apparatus of claim 4 wherein said second sensing means is responsive to the extinction of an arc for generating an output and further includes means responsive thereto for closing said valve means at a predetermined time interval after said arc is extinguished.

6. The apparatus of claim 5 wherein said valve closing means further comprises second energy storage means being charged when the power from said supply is increased and being adapted to discharge the energy stored therein when the power from said supply is reduced;
   second comparator means for detecting the discharge of said second energy storage means to a predetermined level for closing said valve means.

7. The apparatus of claim 5 further comprising means for monitoring the flow of gas from said valve means to said torch;
   means responsive to the absence of gas to prevent an arc from being struck even though said valve means is open and said power reducing means is short-circuited.

8. The control apparatus of claim 5 wherein said power reducing means comprises high power resistance means coupled between said torch and said power supply and having a resistance value selected to reduce current flow therebetween to a level insufficient to either initiate or sustain an arc.

9. The apparatus of claim 1 wherein said first sensing means comprises comparator means for providing an enabling output when the workpiece is touched by the torch electrode;
   relay means responsive to the enabling output for energizing said valve means to open the valve means and supply gas to the torch.

10. The apparatus of claim 1 wherein said power supply further comprises power supply control means for normally de-energizing the power supply and responsive to said first sensing means for energizing said power supply.

11. In an arc welder including a torch, and a power supply coupled between said torch and a workpiece, control means for selectively supplying power sufficient to initiate and maintain an arc for performing an arc welding operation, said torch including a welding electrode and means for receiving a gas and directing the gas to the welding electrode region, said control means comprising:

current reducing means remotely located from said torch and electrically connected between said torch and said power supply for reducing the current delivered to said torch from said power supply to a level insufficient to initiate welding even though the power supply is energized, while delivering a reduced level of current to the torch and workpiece;

means for selectively short-circuiting said current reducing means;

valve means for selectively coupling the gas receiving means to a gas source;

first sensing means responsive to establishment of an electrical circuit caused when said torch electrode even momentarily contacts said workpiece for opening said valve means and including means for preventing said valve means for closing until after the power delivered to said torch reaches a level sufficient to initiate welding;

first delay means responsive to operation of said first sensing means for activating said short circuiting means a predetermined delay interval after opening of said valve means whereby the power delivered to the workpiece is raised to a level sufficient to initiate and sustain an arc between the torch electrode and the workpiece, while enabling said gas to purge the welding region preparatory to the initiation of an arc;

said first sensing means comprising comparator means for providing an enabling output when the workpiece is touched by the torch electrode;

relay means responsive to the enabling output for energizing said valve means to open the valve means and supply gas to the torch;

said first delay means further comprising second comparator means for generating an enabling output when the input thereto reaches a predetermined threshold;

said first delay means being coupled to the input of said second comparator means for applying an enabling signal to said second comparator means after a predetermined time interval; and said short-circuiting means being coupled to said second comparator means and being comprised of normally open contact means being closed by said second comparator means after said time interval to provide sufficient energy for initiating an arc.

12. The apparatus of claim 11 further comprising third comparator means;

said second delay means coupled between said first and third comparator means for disabling said third comparator means a predetermined time interval after the input of said first comparator means reaches said first thresold to close said valve means.

13. The apparatus of claim 11 further comprising switch means responsive to the absence of gas flow between said gas source and said torch, said switch means being coupled between said delay means and said first comparator means and being adapted to disable said delay means and said second comparator means to prevent said contactor means from closing when no gas is present to prevent accidental arcing.

14. In an arc welder including a torch, and a power supply coupled between said torch and a workpiece, control means for selectively supplying power sufficient to initite and maintain an arc for performing an arc welding operation, said torch including a welding electrode and means for receiving a gas and directing the gas to the welding electrode region, said control means comprising:

current reducing means remotely located from said torch and electrically connected between said torch and said power supply for reducing the current delivered to said torch from said power supply to a level insufficient to initiate welding even though the power supply is energized, while delivering a reduced level of current to the torch and workpiece;

means for selectively short-circuiting said current reducing means;

valve means for selectively coupling the gas receiving means to a gas source;

first sensing means responsive to establishment of an electrical circuit caused when said torch electrode even momentarily contacts said workpiece for opening said valve means and including means for preventing said valve means from closing until after the power delivered to said torch reaches a level sufficient to initiate welding;

first delay means responsive to operation of said first sensing means for activating said short circuiting means a predetermined delay interval after opening of said valve means whereby the power delivered to the torch is raised to a level sufficient to initiate and sustain an arc between the torch electrode and the workpiece, while enabling said gas to purge the welding region preparatory to the initiation of an arc;

said power supply further comprising power supply control means for normally de-energizing the power supply and responsive to said first sensing means for energizing said power supply; and a power source coupled to the torch electrodes, the power of said power source being insufficient to either initiate or sustain an arc; impedance means coupled between said power source and one of said torch electrodes; whereby the control functions of said first sensing means are powered for normal operation although said welding power supply is de-energized.

15. The apparatus of claim 14 further comprising second sensing means responsive to the extinction of an arc for generating an output and means responsive thereto for closing said valve means a predetermined time interval after said arc is extinguished.

16. The apparatus of claim 15 wherein said power supply control means is responsive to said second sensing means for de-energizing said power supply when the arc is extinguished.

17. The apparatus of claim 16 wherein said power supply control means de-energizes the power supply responsive to operation of said valve closing means.

18. The apparatus of claim 14 further comprising means for normally maintaining the welding power supplied deenergized and responsive to said first sensing means for energizing the welding power supply when said torch is first touched upon the work piece.

19. The apparatus of claim 18 wherein said control means is adapted to turn off said welding power supply when said gas valve means is closed.

* * * * *